United States Patent [19]
Ward et al.

[11] Patent Number: 5,741,834
[45] Date of Patent: *Apr. 21, 1998

[54] LOW COMPRESSION SET SILICONE ELASTOMERS

[75] Inventors: Brian John Ward, Valley Falls; Edward Matthew Jeram, Burnt Hills; Richard Albert Striker, Troy, all of N.Y.

[73] Assignee: General Electric Company, Pittsfield, Mass.

[*] Notice: The term of this patent shall not extend beyond the expiration date of Pat. No. 5,717,010.

[21] Appl. No.: 728,415

[22] Filed: Oct. 10, 1996

Related U.S. Application Data

[63] Continuation of Ser. No. 450,293, May 25, 1995, abandoned, which is a continuation of Ser. No. 824,849, Jan. 23, 1992, abandoned.

[51] Int. Cl.$^6$ .................. C08K 9/06; C08K 3/26
[52] U.S. Cl. .............. 523/213; 524/588; 524/425; 524/862; 524/861; 524/731; 524/788; 524/773
[58] Field of Search ............... 524/588, 425, 524/862, 861, 731, 788, 773; 523/213

[56] References Cited

U.S. PATENT DOCUMENTS

| | | | |
|---|---|---|---|
| 3,284,406 | 11/1966 | Nelson | 260/46.5 |
| 3,436,366 | 4/1969 | Modic | 260/37 |
| 3,445,420 | 5/1969 | Kookootsedes et al. | 260/37 |
| 3,884,866 | 5/1975 | Jeram et al. | 260/32.85 B |
| 4,340,709 | 7/1982 | Jeram et al. | 528/15 |
| 4,500,659 | 2/1985 | Kroupa et al. | 523/213 |
| 4,536,553 | 8/1985 | Rufer et al. | 525/106 |
| 4,677,141 | 6/1987 | Cornelius et al. | 523/203 |
| 4,929,669 | 5/1990 | Jensen | 524/861 |

FOREIGN PATENT DOCUMENTS

| | | |
|---|---|---|
| A-0 240 162 | 10/1987 | European Pat. Off. . |
| A-0 380 875 | 8/1990 | European Pat. Off. . |
| A-0 415 180 | 3/1991 | European Pat. Off. . |
| A-0 509 515 | 10/1992 | European Pat. Off. . |

*Primary Examiner*—Karen A. Dean
*Attorney, Agent, or Firm*—Kenneth S. Wheelock

[57] ABSTRACT

The present invention provides novel vinyl containing organopolysiloxane elastomers which possess excellent low compression set and heat aging characteristics and which can advantageously be formulated into liquid silicone elastomer moldable compositions.

10 Claims, No Drawings

LOW COMPRESSION SET SILICONE ELASTOMERS

This is a continuation of Ser. No. 08/450,293 filed on May 25, 1995 now abandoned which is a continuation of Ser. No. 07/824,849 filed on Jan. 23, 1992, also now abandoned.

The present invention relates to a fast curing silicone elastomer composition. More particularly, the present invention relates to vinyl containing silicone elastomer compositions which are useful as fast curing compounds and as liquid injection moldable compositions. These novel silicone elastomer compositions of the present invention have excellent low compression set and heat aging characteristics.

BACKGROUND OF THE PRESENT INVENTION

Polyorganosiloxane compositions that can be cured to form elastomeric products are well known in the art. Modified organopolysiloxanes have been prepared in the prior art by polymerizing monomers containing aliphatic unsaturation in the presence of organopolysiloxanes containing terminal hydroxyl or hydrolyzable groups and free radical initiators.

Rufer et al., U.S. Pat. No. 4,536,553, disclose improving the flex life of silicone elastomers having olefinic unsaturation by mixing with the silicone elastomer a vinyl acetate ethylene copolymer in the presence of a free radical catalyst at an elevated temperature.

Jensen, U.S. Pat. No. 4,929,669, in an attempt to achieve low compression set, teaches the presence of a vinyl-specific peroxide in a liquid diorganopolysiloxane containing at least two silicon-bonded vinyl radicals per molecule which are curable to elastomers by a platinum catalyzed hydrosilation reaction. However, the combination tends to retard the platinum cure.

Kroupa et al., U.S. Pat. No. 4,500,659, disclose an extrudable, curable silicone elastomer composition prepared by reacting a reinforcing silica filler in a high viscosity marginally extrudable silicon elastomer composition with a liquid fluorinated polyorganosiloxane.

Special mention is made of Nelson, U.S. Pat. No. 3,284,406 which discloses a mixture consisting essentially of (1) a polysiloxane of the formula

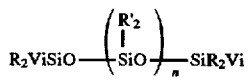

in which R and R' are phenyl or methyl and at least 80 mole percent of the R' groups are methyl, said siloxane (1) having a viscosity of from 500 to 500,000 centipoise inclusive at 25° C.; (2) from 5 to 50 percent by weight based on the weight of (1) and (2) of a copolymer of $SiO_2$, $Me_3SiO_{0.5}$ and $Me_2ViSiO_{0.5}$ siloxane units in which copolymer there is from 1.5 to 3.5 percent by weight vinyl groups based on the weight of (2) and in which copolymer (2) the ratio of total $Me_3SiO_{0.5}$ and $Me_2ViSiO_{0.5}$ to $SiO_2$ units is from 0.6:1 to 1:1; (3) a compound compatible with (1) and (2) which is a siloxane containing from 0.1 to 1.7 percent by weight silicon bonded hydrogen atoms the remaining valences in (3) being satisfied by phenyl or methyl radicals, there being at least three silicon-bonded hydrogen atoms per molecule, and in (3) any hydrocarbon radicals attached to an SiH silicon being essentially all methyl radicals, the amount of (3) being such that there is from 0.75 mol of SiH per mol of vinyl radicals in (1) and (2) to 1.5 mol of SiH per mol of vinyl radicals in (1) and (2); and (4) a platinum catalyst.

Jeram et al., U.S. Pat. No. 3,884,866 disclose an organopolysiloxane composition comprising a first component comprising a mixture of two vinyl-containing polysiloxanes or blends of vinyl-containing polysiloxanes one of which is a high viscosity polysiloxane and the other of which is a low viscosity polysiloxane, a filler and an effective amount of a platinum catalyst; and a second component comprising a hydrogen-containing silane or polysiloxane.

Jeram et al., U.S. Pat. No. 4,340,709 disclose an addition curing silicone composition with a low viscosity in the uncured state and high physical strength in the cured state comprising a vinyl-containing diorganopolysiloxane polymer, a platinum catalyst, a hydride cross-linking agent and a linear hydride coupler in which the viscosity of the linear hydride coupler varies from 1 to 1,000 centipoise at 25° C.

However, the prior art silicone elastomers, while providing good solvent resistance and other physical properties suffer from such drawbacks as poor heat aging and high compression set characteristics making them unsuitable for use in many applications, such as gaskets. It would therefore represent a notable advance in the state of the art if a silicone composition could be provided having excellent heat stability characteristics, rendering the composition useful where heat stability is important such as in gasketing, coatings and potting applications as measured by oven aging and percent compression set. Unexpectedly, the compositions of the present invention satisfy such a long felt need, exhibiting excellent low compression set and heat aging characteristics. Such surprising results are shown in the working examples hereinbelow.

SUMMARY OF THE INVENTION

According to the present invention there is provided a fast curing silicone composition having low compression set and excellent heat aging properties comprising a silicone component of the general formula: $MM^{vi}Q$ wherein M is $R_3SiO_{1/2}$; $M^{vi}$ is $CH_2=CHR_2SiO_{1/2}$; and Q is $SiO_{4/2}$ where R, $R^1$ and $R^2$ are independently each alkyl of from 1 to about 8 carbon atoms or cycloalkyl or cycloalkenyl of from 5 to about 10 carbon atoms or aryl of from 6 to about 12 carbon atoms and wherein the ratio of M and $M^{vi}$ units to Q units ranges from 1.1 to about 2.0.

Also according to the present invention there is provided a fast curing liquid silicone elastomer organopolysiloxane composition comprising (a) a first silicone component of the formula $MM^{vi}Q$ wherein M is $R_3SiO_{3/2}$; $M^{vi}$ is $R^1=R^2R_2SiO_{3/2}$; and Q is $SiO_{4/2}$ where R is alkyl of from 1 to about 8 carbon atoms or cycloalkyl or cycloalkenyl of from 5 to about 10 carbon atoms or aryl of from 6 to about 12 carbon atoms and wherein the ratio of M and $M^{vi}$ units to Q units ranges from 1.1 to about 2.0; (b) a second component comprising a vinyl-containing diorganopolysiloxane having the formula

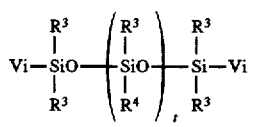

where Vi is vinyl, and $R^3$ and $R^4$ are monovalent hydrocarbon radicals other than olefinic radicals and t varies such that the viscosity of the diorganopolysiloxane varies from 100 to 200,000 centipoise at 25° C.; (c) from 0.1 to 50 parts per million of the total organopolysiloxane composition of a platinum catalyst; and (d) from 0.1 to 25 parts by weight of a curing agent selected from the group consisting of hydrogen containing silanes and hydrogen containing polysiloxanes and mixtures thereof.

According to the present invention there is also provided a fast curing silicone composition having low compression set of the general formula: $MM^{vi}QD$ wherein: M is $R_3SiO_{1/2}$; $M^{vi}$ is $CH_2=CH_1R_2SiO_{1/2}$; Q is $SiO_{4/2}$; and D is $R_2SiO_{2/2}$ in an amount sufficient to lower the compression set by at least about 20% and where R is alkyl of from 1 to about 8 carbon atoms or cycloalkyl or cycloalkenyl of from 5 to about 10 carbon atoms or aryl of from 6 to about 12 carbon atoms.

Also according to the present invention there is provided a fast curing liquid silicone elastomer organopolysiloxane composition comprising (a) a first silicone component of the formula $MM^{vi}QD$ wherein: M is $R_3SiO_{1/2}$; $M^{vi}$ is $CH_3=CH_2R_2SiO_{1/2}$; Q is $SiO_{4/2}$; and D is $R_2SiO_{2/2}$ in an amount sufficient to lower the compression set by at least about 20% and where R is alkyl of from 1 to about 8 carbon atoms or cycloalkyl or cycloalkenyl of from 5 to about 10 carbon atoms or aryl of from 6 to about 12 carbon atoms; (b) a second component comprising a vinyl-containing diorganopolysiloxane having the formula

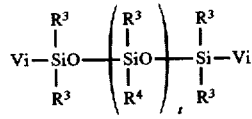

where Vi is vinyl, and $R^3$ and $R^4$ are monovalent hydrocarbon radicals other than olefinic radicals and t varies such that the viscosity of the diorganopolysiloxane varies from 100 to 200,000 centipoise at 25° C.; (c) from 0.1 to 50 parts per million of the total organopolysiloxane composition of a platinum catalyst; and (d) from 0.1 to 25 parts by weight of a curing agent selected from the group consisting of hydrogen containing silanes and hydrogen containing polysiloxanes and mixtures thereof.

DETAILED DESCRIPTION OF THE PRESENT INVENTION

Novel silicone compositions which cure fast to low compression set elastomers exhibiting excellent heat aging properties are provided by the present invention.

In one aspect of the present invention, the silicone component (a) useful in the practice of the present invention is of the general formula:

$$MM^{vi}Q \qquad (1)$$

wherein M is $R_3SiO_{1/2}$; $M^{vi}$ is $CH_2=CHR_2SiO_{1/2}$; and Q is $SiO_{4/2}$ where R is alkyl from 1 to about 8 carbon atoms or cycloalkyl or cycloalkenyl of from 5 to about 10 carbon atoms or aryl of from 6 to about 12 carbon atoms.

Preferably, R is selected from hydrocarbon radicals such as methyl, ethyl, propyl, butyl, pentyl, hexyl, heptyl, octyl, cyclopentyl, cyclohexyl, cycloheptyl, cyclooctyl, cyclononyl, cyclodecyl, benzyl, phenyl, cumyl, xylyl, tolyl and the like. Most preferred are methyl and phenyl.

It is essential to the present invention that the silicone polymers have a ratio of M and $M^{vi}$ units to Q units of above 1.1, preferably from 1.1 to about 2.0, and more preferably from 1.1 to about 1.5. Those silicone polymers with a ratio of M and $M^{vi}$ units to Q units less than 1.1, particularly less than 1.0, do not exhibit the low compression set characteristics of the compositions of the present invention, and are therefore not useful as a gasket material.

In another aspect of the present invention, the silicone component (a) useful in the practice of the present invention is of the general formula:

$$MM^{vi}QD \qquad (2)$$

wherein M is $R_3SiO_{1/2}$; $M^{vi}$ is $CH_2=CHR_2SiO_{1/2}$; Q is $SiO_{4/2}$; and D is $R_2SiO_{2/2}$; wherein the amount of D in the silicone polymer is an amount sufficient to lower the compression set by at least about 20% and where R, is alkyl of from 1 to about 8 carbon atoms or cycloalkyl or cycloalkenyl of from 5 to about 10 carbon atoms or aryl of from 6 to about 12 carbon atoms.

Preferably, R is selected from hydrocarbon radicals such as methyl, ethyl, propyl, butyl, pentyl, hexyl, heptyl, octyl, cyclopentyl, cyclohexyl, cycloheptyl, cyclooctyl, cyclononyl, cyclodecyl, benzyl, phenyl, cumyl, xylyl, tolyl and the like. Most preferred are methyl and phenyl.

It is essential to the practice of the present invention that when the silicone polymers of formula (2) are employed, the ratio of D units to Q units is less than about 8:1, preferably from about 0.5:1 to about 8:1, more preferably from about 0.6:1 to about 5:1, and most preferably from about 0.9:1 to about 2:1. Where the ratio of D units to Q units is greater than 10:1, the composition gels and is not useful in liquid silicone elastomer formulations.

The novel silicones of formulae (1) and (2) of the present invention are prepared by methods known to those skilled in the art.

The compositions of the present invention can be formulated into fast curing liquid silicone elastomer (LSE) organopolysiloxane compositions. These LSE compositions typically contain an additional component comprising from about 25 to about 99 parts by weight of a base vinyl containing diorganopolysiloxy polymer having a viscosity varying from 100 to 200,000 centipoise at 25° C., where the $(CH_3)_2ViSiO_{0.5}$ content generally varies from 0.005 to 3.5 and more preferably varies from 0.015 to 2.6 mole percent. The organic groups are monovalent hydrocarbon radicals. Preferably, the organo groups are selected from alkyl radicals such as methyl, ethyl, propyl, etc.; alkenyl radicals such as vinyl, allyl, etc.; cycloalkyl radicals such as cyclohexyl, cycloheptyl, etc.; mononuclear aryl radicals such as phenyl, ethylphenyl, etc.; and haloalkyl radicals such as 3,3,3-trifluoropropyl. Most preferably the monovalent hydrocarbon radical is selected from an alkyl radical of 1 to 8 carbon atoms or phenyl. Preferably there is no vinyl or alkenyl radicals in the central part of the polysiloxane chain of the base vinyl containing polymer. This is especially important in the instant case since the vinyl groups in the internal position of the polymer chain will tend to crosslink rather than be extended. Accordingly, preferably, the base vinyl containing polymer does not have any vinyl groups or olefinic unsaturated groups in the internal position of the polymer chain but just has vinyl in the terminal position of the polymer chain.

A particularly preferred second component comprises a vinyl-containing diorganopolysiloxane having the formula

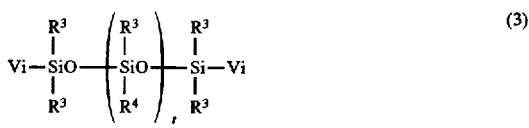

(3)

where Vi is vinyl, and $R^3$ and $R^4$ are monovalent hydrocarbon radicals other than olefinic radicals and t varies such that the viscosity of the diorganopolysiloxane varies from 100 to 200,000 centipoise at 25° C.

Preferably $R^3$ and $R^4$ are selected from alkyl radicals of 1 to 8 carbon atoms such as methyl, ethyl, propyl; mononuclear aryl radicals such as phenyl, methylphenyl, ethylphenyl; cycloalkyl radicals such as cycloheptyl; and haloalkyl radicals such as 3,3,3-trifluoropropyl. Most preferably, the $R^3$ and $R^4$ radicals are selected from alkyl radicals of 1 to 8 carbon atoms and phenyl.

The polymers of formula (3) are generally prepared by equilibrating the appropriate cyclo tetrasiloxane with the appropriate vinyl terminated low molecular weight polysiloxane chainstoppers. The chainstopper is preferred for such equilibration reaction and is preferably a low molecular weight vinyl terminated polysiloxane compound such as a disiloxane, trisiloxane, tetrasiloxane and so forth. These low molecular weight vinyl terminated polysiloxane polymers are produced by hydrolyzing the appropriate chlorosilanes particularly vinyl diorganochlorosilanes along with diorganodichlorosilanes to produce the desired chainstopper. This chainstopper is then taken in a relatively pure form and equilibrated along the cyclotetrasiloxanes with the appropriate substitute groups in the presence of a catalyst to produce the desired vinyl terminated diorganopolysiloxane polymer having a viscosity varying from 100 to 200,000 centipoise at 25° C. The catalyst that is utilized is preferably a basic catalyst, such as KOH, tetramethyl ammonium hydroxide or sodium hydroxide. When the equilibration has proceeded to the point where about 85% of the cyclopolysiloxanes have been converted to the linear polymer, the basic catalyst is neutralized with an acid to leave behind the linear polymer. Preferably, excess cyclics are stripped off so that the linear polymer will have a low volatile content and be relatively pure.

The compositions of the present invention may also include an effective amount of a filler. Preferred fillers are those known to those skilled in the art, such as, titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers and mixtures of any of the foregoing. Particularly preferred are fumed silica, silazane treated silica, calcium carbonate and mixtures thereof.

The compositions of the present invention further comprise a crosslinking or curing agent such as a silicone hydride polysiloxane. The SiH-containing polysiloxanes contemplated for use herein as crosslinking agents are comprised primarily of compounds having the general formula:

$$M^H D_x D_y{}^H M^H \quad (4)$$

wherein each $M^H$ is independently either hydrogen or a monovalent hydrocarbon radical of from 1 to 8 carbon atoms, with a sufficient number of M groups being hydrogen to provide at least 1% by weight hydrogen as hydrogen per molecule; and where $D^H$ is an SiO— unit. Such polysiloxanes will include, for example, cyclic polymers such as symtetrahydrotetramethylcyclotetrasiloxane, or linear polymers such as alkylhydrogensiloxane fluids or polydialkylalkylhydrogen siloxane copolymers. Particularly useful as crosslinking agents for the present invention are dimethylhydrogen chainstopped, polydimethyl, polymethylhydrogen siloxane fluids having from approximately 10% to 100% SiH groups and having a viscosity in the range of from about 15 to about 500 centipoise at 25° C.

The compositions of the present invention may also comprise a curing agent, which can be present in amounts ranging from 0.1 to 25 parts by weight and can be selected from the group consisting of hydride resins having only terminal hydrogen atoms or a hydride polysiloxane having hydrogen atoms in the terminal and internal portion of the polysiloxane chain. Accordingly, there may be utilized a hydride resin having the formula:

(5)

units and $SiO_2$ units where the $R^5$+H to Si ratio varies from 1.0 to 2.7 or a hydride resin of the formula

(6)

units, $SiO_2$ units and $R^7R^7SiO$ units where the $R^6+R^7+H$ to Si ratio varies from 1.2 to 2.7 and where $R^5$, $R^6$ and $R^7$ are monovalent hydrocarbon radicals other than olefinic hydrocarbon radicals.

Most preferably, $R^5$, $R^6$ and $R^7$ are selected from alkyl radicals of 1 to 8 carbon atoms; mononuclear aryl radicals such as phenyl, ethylphenyl, etc.; cycloalkyl radicals such as cycloheptyl, cyclooctyl; etc.; haloalkyl radicals such as 3,3,3-trifluoropropyl, etc. Most preferably, $R^5$, $R^6$ and $R^7$ are selected from alkyl radicals of 1 to 8 carbon atoms and phenyl radicals. It is important that there be no aliphatic unsaturated groups for the $R^5$, $R^6$ and $R^7$ radicals. These hydrides can be simply produced in the controlled hydrolysis of the corresponding hydride chlorosilanes in the presence of a hydrocarbon organic solvent. For the resin containing only monofunctional units and tetrafunctional units, a hydrogen diorganochlorosilane is hydrolyzed along with a tetrachlorosilane to produce the desired resin. In the case of the resin containing the monofunctional siloxy units, the difunctional siloxy units and the tetrafunctional siloxy units, there is hydrolyzed a hydrogen diorgano dichlorosilane, a tetrachlorosilane and a diorganodichlorosilane in the desired ratios to produce the desired resins. For more information as to the process by which these resins are produced, one is referred to Jeram, U.S. Pat. No. 4,040,101.

In other embodiments of the present invention, there may be used a linear hydrogen containing polysiloxane as the curing agent. Accordingly, there may be utilized a linear hydride polysiloxane having the formula:

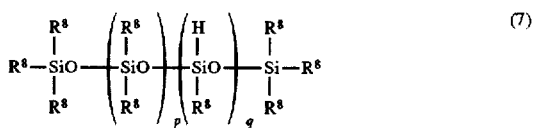

(7)

where $R^8$ is a monovalent hydrocarbon radical other than an olefinic hydrocarbon radical and p and q vary such that the polymer has a viscosity that varies from 1 to 1000 centipoise at 25° C. and wherein the polysiloxane has from 0.04 to 1.7 percent by weight hydrogen.

Such a hydride polymer of Formula (7) above is produced by equilibrating the appropriate hydrogen cyclopolysiloxane with the appropriate cyclo polysiloxane containing $R^8$ substituent groups, in the presence of disiloxane, trisiloxane and other low molecular weight linear triorganosiloxy endstopped chain stoppers. Alternatively, the process comprises hydrolyzing the appropriate chlorosilanes in water alone or in the presence of a hydrocarbon solvent to produce a mixture of cyclic and linear hydride polymers of Formula (7) above. The cyclics can then be stripped off.

The curing reaction which takes place between the vinyl-functional polysiloxane base polymer and the SiH-containing crosslinking agent is an addition cure reaction, known as hydrosilation. The compositions of the present invention may be thermally cured by means of a platinum catalyzed crosslinking reaction between the vinyl groups of the base polymer and the SiH reaction sites of the crosslinker.

Suitable hydrosilation catalysts to be employed in the present invention are known to persons skilled in the art and include metal catalysts utilizing such precious metals as ruthenium, rhodium, palladium, osmium, iridium and platinum, and complexes of these metals. Especially preferred are platinum metal catalysts. Examples of such hydrosilation catalysts are described in, inter alia, Lamoreaux, U.S. Pat. No. 3,220,972; Karstedt, U.S. Pat. Nos. 3,715,334; 3,775,452 and 3,814,730; Ashby, U.S. Pat. Nos. 4,421,903; and 4,288,345; and Saruyama et al., U.S. Pat. No. 5,057,476.

The selection of the particular catalyst will depend upon such factors as speed of reaction desired, expense, useful shelf-life, useful pot-life and the temperature at which the cure reaction is to take place. The amount of catalyst employed is not critical, so long as proper crosslinking is achieved; however, as indicated above, the high cost of these precious metal catalysts makes their conservative use a practical requirement. As with any catalyst, it is preferable to use the smallest effective amount possible. For the coating compositions described herein, enough total catalyst is used to provide from about 10 to about 500 parts per million of precious metal as precious metal.

The liquid silicone compositions (LSE) compositions of the present invention can be added to conventional liquid injection molding apparati for forming plastic or rubber parts. The LSE compositions can also be used to form encapsulated parts with little waste. For liquid silicone elastomer molding applications, it is desired that the uncured viscosity of the molding material be generally in the range of 10,000 to 2,000,000 centipoise at 25° C. If the composition has this viscosity, it can be readily forced into the molding chamber of a molding apparatus such as a liquid injection molding machine. Further, it is necessary for the LSE composition to be a fast curing composition. Upon being heated to elevated temperatures, the molded parts can be formed with rapidity. The faster the parts are formed by the liquid injection molding machine, the lower the cost of the formed part and the more economic the process.

In addition, the foregoing compounds of the present invention may comprise from 100 to 100,000 parts per million of an inhibitor compound selected from the group consisting of vinyl containing organocyclo tetrasiloxanes such as methyl vinyl cyclotetrasiloxane, trialkylcyanurate, an alkyl maleate and mixtures thereof. Also contemplated for use herein as an inhibitor are acetylenic compounds as described in Kookootsedes et al., U.S. Pat. No. 3,445,420. The example of alkyl maleate as an inhibitor in an addition curing silicone composition is, for instance, found in Eckberg, U.S. Pat. No. 4,256,870. With the exception of alkyl maleates, the other inhibitors are relatively mild inhibitors which are utilized to give the composition, when it has been mixed into a single mixture, a certain amount of shelf life at room temperature so that the composition will cure at elevated temperatures, that is, temperatures about 150° to 200° C. in a matter of seconds. However, if it is desired to employ the total composition in a single package composition, there may also be utilized at least 0.001 parts by weight per 100 parts by weight of the base polymer of an inhibitor compound having at least one hydroperoxy radical of the formula —C—O—O—H as disclosed in Bobear, U.S. Pat. No. 4,061,604. The hydroperoxy inhibitors allow all the ingredients to be mixed into a single package and yet the composition will not cure at room temperature for periods as long as six months to 1 year or even more, but when heated at elevated temperatures, those above 125° C., will cure in a rapid manner. These heat cured compositions are suitable for making a thermally stable gasket having a low compression set.

In accordance with the present invention, it is possible to have an addition curing silicone composition having surprisingly excellent low compression set and heat aging characteristics and that has good tensile strength, elongation, tear and durometer hardness. Further, these compositions are suitable to be formulated into liquid silicone elastomer moldable compositions.

DESCRIPTION OF THE PREFERRED EMBODIMENTS

The following examples illustrate the present invention. They are not to be construed to limit the scope of the appended claims in any manner whatsoever.

EXAMPLES 1 AND 1A*

Two silicone compositions are prepared having the following formulations.

TABLE 1

| Example | 1 | 1A* |
|---|---|---|
| Composition, pbw | | |
| MM$^{vi}$Q | 25 | 25 |
| Ratio M + M$^{vi}$:Q | 1.5 | 1.0 |
| Vinyl end stopped high viscosity organopolysiloxane | 75 | 75 |
| Platinum Catalyst$^a$ | 20 | 20 |
| Hydride Crosslinker | 3.5 | 3.5 |
| Properties | | |
| Compression set, % | 10 | 85 |
| Heat Aging$^b$ | +1 | +8 |

$^a$In parts per million of platinum
$^b$Oven heat aging at 177° C. for 70 hours, hardness change points as measured in Shore A From Table 1 above it can be seen that compositions according to the present invention, having a M+M$^{vi}$:Q ratio of above 1.1, exhibit highly desirable low compression set and a vastly increased thermal stability over the compositions of the prior art, having a M+M$^{vi}$:Q ratio of 1.0 or below. The significant improvements in these properties indicates that the compositions of the present invention will form a superior gasket material.

EXAMPLE 2

The procedure of Example 1 is followed except that there is included 20 parts by weight of treated fumed silica and 10 parts by weight of Minusil filler. The product composition has a compression set value of 20%.

EXAMPLE 3

The composition of Example 1 is formed into a gasket by heat curing the composition for 60 seconds at 177° C.

EXAMPLE 4

The composition prepared in Example 2 is formed into a gasket by heat curing the composition for 60 seconds at 177° C.

EXAMPLES 5 AND 6

Two silicone compositions are made having the following formulations.

TABLE 2

| Example | 5 | 6 |
| --- | --- | --- |
| Composition, pbw | | |
| MM$^{Vi}$QD | 25 | 25 |
| Ratio D:Q | 1.0 | 0.8 |
| Vinyl end stopped high viscosity organopolysiloxane | 75 | 75 |
| Platinum Catalyst$^a$ | 20 | 20 |
| Hydride crosslinker | 3.5 | 3.5 |
| SiH/SiVi ratio | 1.3 | 1.3 |
| Properties | | |
| Compression set, % | 27 | 89 |
| Heat aging$^b$ | +2 | +5 |

$^a$In parts per million platinum
$^b$Oven heat aging for 70 hours at 177° C., measured as change in points in hardness (Shore A)

From Table 2 above, it can be clearly seen that silicone compositions of the present invention having a ratio of D:Q of 0.8:1 or more have significantly improved compression set and heat aging properties over those having a D:Q ratio of 0.8:1 or less. Such excellent properties makes the compositions of the present invention eminently suitable as gasket materials.

EXAMPLES 7 AND 7A*

Two silicone compositions are prepared according to the following formulations.

TABLE 3

| Example | 7 | 7A* |
| --- | --- | --- |
| Composition, pbw | | |
| MM$^{Vi}$OD$^a$ (D/Q 1:1) | 25 | — |
| MQD$^{Vi}$ (M/Q = 0.67) | — | 25 |
| Vinyl end stopped high viscosity organopolysiloxane | 75 | 75 |
| Platinum Catalyst$^b$ | 20 | 20 |
| Hydride crosslinker | 3.5 | 3.5 |
| Filler$^c$ | 30 | 30 |

TABLE 3-continued

| Example | 7 | 7A* |
| --- | --- | --- |
| Properties | | |
| Shore Durometer | 58 | 60 |
| Tensile, psi | 800 | 1100 |
| % Elongation | 400 | 600 |
| Tear strength, psi | 130 | 250 |
| Compression set, % | 27 | 90 |
| Heat Aging$^d$ | +1 | +12 |

*Comparative Example
$^a$Dimethyl D units or a blend of dimethyl D units and methyl vinyl D units
$^b$In parts per million platinum
$^c$Minusil (alpha quartz), fumed silica mixture
$^d$Change in hardness after heat aging for 70 hours at 177° C. (Shore A)

From Table 3 above, it can readily be seen that filled compositions of the present invention exhibit much lower compression set and improved heat aging over compositions of the prior art, thus making them a more suitable material for gasket applications.

EXAMPLE 8

The procedure of Example 6 is followed and the composition is heat cured for 60 seconds at 177° C. to form a gasket.

EXAMPLE 9

The procedure of Example 7 is followed and the composition is heat cured for 60 seconds at 177° C. to form a gasket.

The above-mentioned patents and publications are hereby incorporated by reference.

Many variations of the present invention will suggest themselves to those skilled in the art in light of the above detailed description. For example, a wide variety of fillers and/or inhibitors can be added to the compositions of the present invention for their desired properties. It is further within the scope of the instant invention to include conventional additives, in desired amounts, such as gum cure accelerators, controlled release agents, fillers, anti-microbial agents, pigments, dyes, mixtures thereof and the like, in the present compositions. All such obvious modifications are within the scope of the appended claims.

We claim:

1. A fast curing silicone polymer resin composition having low compression set consisting essentially of:

(a) a silicone component of the general formula:

$$MM^{Vi}QD$$

wherein
   M is $R_3SiO_{1/2}$,
   $M^{Vi}$ is $CH_2=CH_2R_2SiO_{1/2}$,
   Q is $SiO_{4/2}$,
   and D is $R_2SiO_{2/2}$ where each R is independently selected and R is alkyl of from 1 to about 8 carbon atoms, cycloalkyl or cycloalkenyl of from 5 to about 10 carbon atoms or aryl of from 6 to about 12 carbon atoms wherein the ratio of M and $M^{Vi}$ units to Q units ranges from 1.1 to about 2.0 and the ratio of D units to Q units is from about 0.5 to about 8;

(b) a dimethyl vinyl chainstopped diorganopolysiloxane polymer of the formula:

$M^{Vi}DtM^{Vi}$ where $M^{Vi}$ is as previously defined, D is $R_2SiO_{2/2}$ units where R is as defined above wherein the subscript t defines a polymer having a viscosity ranging from 100 to 200,000 centipoise at 25° C.;

(c) a platinum catalyst; and (d) a crosslinking or curing agent selected from the group consisting of hydrogen containing silanes, hydrogen containing polysiloxanes and mixtures thereof.

2. A fast curing low compression set silicone polymer/resin composition as defined in claim 1 wherein said D/Q ratio ranges from about 0.6:1 to about 5:1.

3. A fast curing low compression set silicone polymer/resin composition as defined in claim 2 wherein said D/Q ratio ranges from about 0.9:1 to about 2:1.

4. A fast curing low compression set silicone polymer/resin composition as defined in claim 1 further comprising a filler.

5. A fast curing low compression set silicone polymer resin composition as defined in claim 4 wherein said filler is selected from the group consisting of titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers and mixtures of any of the foregoing.

6. A fast curing low compression set silicone polymer/resin composition as defined in claim 5 wherein said filler is selected from the group consisting of fumed silica, silazane treated silica, calcium carbonate and mixtures of any of the foregoing.

7. A fast curing low compression set silicone polymer/resin composition as defined in claim 1 further comprising from an inhibitor compound selected from the group consisting of vinyl-containing organocyclotetrasiloxane, trialkyl cyanurate, alkyl maleate, acetylenic compounds and mixtures of any of the foregoing.

8. A fast curing low compression set silicone polymer/resin composition as defined in claim 1 further comprising at least an inhibitor compound having at least one hydroperoxy radical of the formula —C—O—O—H.

9. A thermally stable gasket having a low compression set and comprising a heat cured composition as defined in claim 1.

10. A thermally stable gasket having a low compression set and comprising a heat cured filled composition as defined in claim 1.

* * * * *